United States Patent [19]

Schneider et al.

[11] 4,360,546

[45] Nov. 23, 1982

[54] ELECTRICAL DISCHARGE LAMP ENVELOPE

[75] Inventors: Hartmut Schneider, Munich; Josef Grabmaier, Berg, both of Fed. Rep. of Germany

[73] Assignee: Siemens Aktiengesellschaft, Berlin & Munich, Fed. Rep. of Germany

[21] Appl. No.: 363,029

[22] Filed: Mar. 29, 1982

Related U.S. Application Data

[62] Division of Ser. No. 117,550, Feb. 1, 1980, Pat. No. 4,345,180.

[30] Foreign Application Priority Data

Feb. 16, 1979 [DE] Fed. Rep. of Germany ....... 2906038

[51] Int. Cl.$^3$ ............................ B05D 3/02; H01J 7/00
[52] U.S. Cl. .................................... 427/255; 427/107; 427/167; 427/255.3; 427/444

[58] Field of Search ............ 427/107, 167, 255, 255.3, 427/444

[56] References Cited

U.S. PATENT DOCUMENTS 2,030,389 2/1936 Navias ........................... 427/107 X
2,030,390 2/1936 Navias ........................... 427/107 X

*Primary Examiner*—James R. Hoffman
*Attorney, Agent, or Firm*—Hill, Van Santen, Steadman, Chiara & Simpson

[57] ABSTRACT

A lamp envelope comprised of silica glass having a $SiO_2$—$B_2O_3$ glass layer on an inner surface thereof is coated on the free surface of such $SiO_2$—$B_2O_3$ glass layer with a protective layer comprised of a silica glass having a lower $B_2O_3$ amount relative to the $B_2O_3$ amount in the $SiO_2$—$B_2O_3$ glass layer.

5 Claims, No Drawings

ELECTRICAL DISCHARGE LAMP ENVELOPE

This is a division, of application Ser. No. 117,550, filed Feb. 1, 1980 now U.S. Pat. No. 4,345,180.

BACKGROUND OF THE INVENTION

1. Field of the Invention

The invention relates to electric lamp envelopes and somewhat more particularly to glass lamp envelopes provided with a $SiO_2$-$B_2O_3$ glass layer on the inner surface thereof and a method of producing such envelopes.

2. Prior Art

Energy-saving operations due to high light yields are achieved with high-pressure gas discharge electric lamps utilizing operating temperatures ranging from about 4000° to 6000° Kelvin in the discharge zone of such lamps. Such operating temperatures cause significant thermal and mechanical stress on the walls of such lamp envelopes. Therefore, the prior art utilizes a silica glass as the envelope material for metal/halogenide discharge lamps. The loadability or, alternatively, the life-expectancy of such lamps are limited by the aging or deterioration of the silica glass envelopes. Particularly, crystallization of silica is detrimental to the life-expectancy of envelopes and must be suppressed in silica glass envelopes. To achieve crystallization suppression, a process known as "boronization" is used whereby boron oxide is diffused into the silica glass envelope on the interior surface thereof as a crystallization inhibitor. The resultant silica glass envelope then has a $SiO_2$-$B_2O_3$ layer a few $\mu m$ in thickness on its inner surface and such material exhibits a relatively low crystallization tendency. However, the hydroscopic nature of this layer is of great disadvantage because water bonded in or on such $SiO_2$-$B_2O_3$-layer reduces the light permeability and thereby causes an increase of the envelope temperature of the lamp. Further, water effects material transport mechanisms within the lamp in an undesirable manner. Yet further, the difference between the respective coefficients of expansion of $SiO_2$ and $SiO_2$-$B_2O_3$ glass has an unfavorable effect. This difference can cause fissures, cracks and the like to form in the $SiO_2$-$B_2O_3$ layer of a boronized lamp envelope and significantly detracts from the manufacture of durable electrode seals.

Up to the present time, boronized lamp envelopes were stored in the dryest possible atmosphere before being hermetically sealed. No attention was given to a water-free state during boronization. In forming the necessary electrode seals, special un-boronized silica glass envelope sections were joined to the boronized lamp envelope sections.

SUMMARY OF THE INVENTION

The invention provides an electric discharge lamp envelope having an outer silica glass layer, an intermediate $SiO_2$-$B_2O_3$ layer and an inner protective layer which minimizes the hydroscopic nature of the intermediate layer and thereby minimizes the above-described attendant disadvantages.

In accordance with the principles of the invention, a $SiO_2$-$B_2O_3$ glass layer of a lamp envelope is covered with a protective layer comprised of a silica glass having a lower $B_2O_3$ concentration relative to the concentration of $B_2O_3$ in the $SiO_2$-$B_2O_3$ layer.

In a preferred embodiment of the invention, the protective layer is relatively thin and is composed of relatively pure silica glass.

DESCRIPTION OF THE PREFERRED EMBODIMENTS

The invention provides an improved electrical discharge lamp envelope comprised of silica glass having a $SiO_2$-$B_2O_3$ glass layer on inner surfaces thereof and a protective layer on the innermost surface of the $SiO_2$-$B_2O_3$ glass layer. Such protective layer is comprised of a silica glass having a lower $B_2O_3$ concentration relative to the concentration of $B_2O_3$ in the $SiO_2$-$B_2O_3$ glass layer of such lamp envelope. The maximum $B_2O_3$ content of the protective layers should not exceed 3 percent per weight. The invention also provides a method of producing such improved lamp envelopes.

Advantageously, the thickness of the inventive protective layer is regulated so that during lamp operation, it is either eroded or enriched with $B_2O_3$ via material transport mechanisms. The thickness of the inventive protective layer should only be sufficient that, given a potential crystallization, it does not materially interfere with the light flux of the lamp. Expediently, the protective layer of the invention should have a maximum thickness of about 1.5 $\mu m$. It is advantageous when $SiO_2$ crystals are unstable on a $SiO_2$-$B_2O_3$-support or underlayer and can decompose during lamp operation.

The protective layer of the invention provides an effective safeguard or defense against water absorption because a relatively pure $SiO_2$-layer free of $B_2O_3$ or, alternatively, having a relatively low concentration of $B_2O_3$, is significantly less hydroscopic than a typical boronized silica layer. Further, such protective layer reduces the tendency of fissure or crack formation in a resultant envelope structure because such layer encloses the $B_2O_3$-rich $SiO_2$ intermediate layer, which is under tensile stress.

The protective layer of the invention can be produced in such a manner that $B_2O_3$ is partially diffused out of an upper region of the $SiO_2$-$B_2O_3$ layer of a boronized lamp envelope. Alternatively, such protective layer can be produced by depositing a layer composed of $SiO_2$ or a $SiO_2$-$B_2O_3$ mixture from a suitable gaseous reaction mixture at elevated reaction temperatures so that pyrolytic decomposition of said reactive gas occurs and the deposited layer is bonded onto the free surface of the $SiO_2$-$B_2O_3$ layer and has a lower $B_2O_3$ content relative to the $B_2O_3$ content in the underlying $SiO_2$-$B_2O_3$ layer. In a similar manner, the protective layer can be produced by depositing a layer of a material selected from the group consisting of $SiO_2$ or a $SiO_2$-$B_2O_3$ mixture onto the upper or free surface of a $SiO_2$-$B_2O_3$ layer via a hydrolytic reaction from a suitable reaction mixture whereby the deposited layer is bonded onto the free surface of the $SiO_2$-$B_2O_3$ layer and has a lower $B_2O_3$ content relative to the $B_2O_3$ content in the underlying layer.

A particularly preferred method of producing a $SiO_2$-$B_2O_3$ layer on a silica surface is via the chemical vapor deposition technique (sometimes referred to as the CVD process) whereby a suitable gaseous reaction mixture, for example containing $SiCl_4$-$BCl_3$-$O_2$, is brought into contact with a glass surface at a elevated reaction temperature, preferably about 1900° K., so that pyrolitic decomposition occurs and a mixture of $SiO_2$ and $B_2O_3$ is deposited and bonded onto such glass surface. This method has been utilized heretofore in the manufacture of preforms for optical glass fibers [see J. Grabmaier et al, Siemens Forschungs- und Entwicklungsbericht (Research and Development Reports) Vol. 5, (1976) pages 171–173]. With this process, it is possible to deposite and bond water-free, easily processible and readily reproduceable glass layers of the described type in a relatively short time period. The deposition of the protective layer is thereafter achieved by omitting the $BCl_3$ content of the gaseous reaction mixture. The resultant region has a lower $B_2O_3$ content relative to the $B_2O_3$ content in the $SiO_2$-$B_2O_3$.

The foregoing is considered as illustrative only of the principles of the invention. Further, since numerous modifications and changes will readily occur to those skilled in the art, it is not desired to limit the invention to the exact details and operations shown and described, and accordingly, all suitable modifications and equivalence may be resorted to, falling within the scope of the invention as claimed.

We claim as our invention:

1. A method of producing a protective layer on a $SiO_2$-$B_2O_3$ layer positioned on a silica glass substrate, comprising:
subjecting said $SiO_2$-$B_2O_3$ layer to diffusion conditions so that at least some $B_2O_3$ at an upper region of said layer is diffused out and the resultant region has a lower $B_2O_3$ content relative to the $B_2O_3$ content in said layer.

2. A method of producing a protective layer on a $SiO_2$-$B_2O_3$ layer positioned on a silica glass substrate, comprising:
depositing a layer of a material selected from the group consisting of $SiO_2$ and a $SiO_2$-$B_2O_3$ mixture onto a free surface of said $SiO_2$-$B_2O_3$ layer from a suitable gaseous reaction mixture at elevated reaction temperatures so that a pyrolytic decomposition of said reaction mixture takes place and a layer of said material is deposited and bonds onto said free surface of the $SiO_2$-$B_2O_3$ layer and has a lower $B_2O_3$ content relative to the $B_2O_3$ content in said $SiO_2$-$B_2O_3$ layer.

3. A method of producing a protective layer as defined in claim 1 wherein said gaseous reaction mixture contains a $SiCl_4$-$BCl_3$-$O_2$ gas mixture and said elevated reaction temperatures are equal to about 1900° K.

4. A method of producing a protective layer on a $SiO_2$-$B_2O_3$ layer positioned on a silica glass substrate, comprising:
depositing a layer of a material selected from the group consisting of $SiO_2$ and a $SiO_2$-$B_2O_3$ mixture onto a free surface of said $SiO_2$-$B_2O_3$ layer from a suitable reaction mixture at elevated reaction temperatures so that a hydrolytic reaction takes place and said layer is deposited and bonds onto said free surface of the $SiO_2$-$B_2O_3$ layer and has a lower $B_2O_3$ content relative to the $B_2O_3$ content in said $SiO_2$-$B_2O_3$ layer.

5. A method of producing a protective layer as defined in claim 4 wherein said reaction mixture contains $SiCl_4$-$BCl_3$-$O_2$ and said elevated reaction temperature is equal to about 1900° K.

* * * * *